United States Patent [19]

Thiele et al.

[11] Patent Number: 4,486,102
[45] Date of Patent: Dec. 4, 1984

[54] MIXING APPARATUS FOR MULTI-COMPONENT PLASTICS, ESPECIALLY POLYURETHANE

[75] Inventors: Heino Thiele, Ludwigshafen; Werner Weber, Mannheim; Hans D. Zettler, Gruenstadt; Klaus Schlueter, Munich; Josef Wallner, Holzkirchen; Bernhard Seid, Frankenthal, all of Fed. Rep. of Germany

[73] Assignee: BASF Aktiengesellschaft, Ludwigshafen, Fed. Rep. of Germany

[21] Appl. No.: 477,963

[22] Filed: Mar. 23, 1983

[30] Foreign Application Priority Data

Mar. 25, 1982 [DE] Fed. Rep. of Germany ....... 3210978

[51] Int. Cl.³ .......................... B01F 7/16; B01F 15/02
[52] U.S. Cl. ................................... 366/182; 366/189; 366/192; 366/195; 366/196
[58] Field of Search ................. 222/135, 144, 145; 366/150, 159, 162, 178, 194, 195, 196, 254, 255, 256, 279, 282, 283, 285, 286, 289, 290, 291, 332, 182, 189, 192; 422/133, 135, 136

[56] References Cited

U.S. PATENT DOCUMENTS

| | | | |
|---|---|---|---|
| 2,995,346 | 8/1961 | Samples | 422/133 |
| 3,189,325 | 6/1965 | Levy | 366/289 |
| 4,313,909 | 2/1982 | Boden et al. | 422/133 |

FOREIGN PATENT DOCUMENTS 2550334 5/1977 Fed. Rep. of Germany .
2815460 10/1979 Fed. Rep. of Germany .

Primary Examiner—Robert W. Jenkins
Assistant Examiner—Arthur D. Dahlberg
Attorney, Agent, or Firm—Keil & Weinkauf

[57] ABSTRACT

A mixing head for multicomponent plastics, especially polyurethane, in whose mixing chamber (2) a hollow piston (7) can be moved to and fro to control the component streams. The hollow piston contains an expulsion piston (8), which is movable independently of the hollow piston, and which can be passed through an outlet tube (3) which adjoins the outlet orifice (4). The end face (12) of the hollow piston forms, together with the mixing chamber wall (11) nearest the sprue, a shearing gap in which the components are mixed. As a result of the design and arrangement of the pistons (7) and (8), good mixing is achievable even under critical conditions, and the mixing chamber is also easily cleaned.

4 Claims, 4 Drawing Figures

MIXING APPARATUS FOR MULTI-COMPONENT PLASTICS, ESPECIALLY POLYURETHANE

The present invention relates to a mixing apparatus for multi-component plastics, especially polyurethane, comprising a mixing chamber, which possesses inlet orifices for the individual components and an outlet orifice for the component mixture, as well as a control member which can be moved to and fro between a position which leaves the inlet orifices open and a position which shuts off the inlet orifices to the mixing chamber, the control member being constructed as a hollow piston containing an independently controllable expulsion piston, the end face, facing the mixing chamber, of the hollow piston forming the mixing chamber wall opposite the outlet orifice and the outlet orifice being followed by an outlet tube of smaller cross-section than that of the mixing chamber, through which tube the expulsion piston, having the same cross-section as the outlet tube, can be passed.

In known mixing apparatuses of the above type, the expulsion piston serves as a cleaning piston for the outlet orifice and the outlet tube (German Laid-Open Application DOS No. 2,550,334) or serves to throttle the flow of the component mixture toward the outlet orifice (German Laid-Open Application DOS No. 2,815,460). In many cases, adequate mixing can be achieved with such mixing apparatus, since the outlet orifice has a smaller cross-section than the mixing chamber, and this has an advantageous effect on the degree of mixing. If a higher degree of mixing is demanded, for example if open molds are to be filled—this being done predominantly with mixing apparatus employing a mechanical stirrer and operating at a low pressure—the degree of mixing is frequently inadequate.

A great variety of embodiments of mixing apparatus in which mixing is effected mechanically by means of a stirrer is known. The components to be mixed are fed to the mixing chamber, containing the stirrer, through corresponding lines and via synchronously controlled valves. Normally, the outlet orifice is on the side away from the stirrer shaft. However, a disadvantage of this type of mixing apparatus is that the apparatus must be cleaned by means of a flushing agent and/or of compressed air. Moreover, it is necessary to remove the stirrer from the mixing apparatus at varying intervals of time and to carry out thorough cleaning, which may have to be mechanical.

It is an object of the present invention to provide a mixing apparatus of the type mentioned at the outset, which ensures good mixing even under critical conditions and which can moreover easily be cleaned when necessary.

We have found that this object is achieved if the hollow piston is rotatable and its end face forms a variable shearing gap with the mixing chamber wall nearest the sprue, the gap serving to mix the components.

According to the invention, mixing of the components is effected by the relative movement of the surfaces forming the shearing gap, and the degree of mixing can be varied by choice of the angle of these mutually fitting surfaces relative to the piston axis, varying the gap width and varying the angular velocity of the hollow piston. Cleaning of the mixing chamber is effected by pressing the end face of the rotating hollow piston against the mixing chamber wall in the region of the outlet orifice, and expelling the residual mixture, rubbed off the surfaces, out of the cylindrical outlet tube by means of the expulsion piston.

The mixing apparatus according to the invention can take very many different forms and can be employed in a great variety of ways. Thus it is possible to construct the surfaces which form the shearing gap so that in total they are non-planar and are at least approximately complementary to one another. This makes it possible to achieve particularly intensive mixing of the components, without the formation of inadequately mixed forerun and afterrun, since the repeated change of direction of the component mixture results in substantially laminar, calm flow of the stream of mixture.

The mixing apparatus according to the invention can be combined particularly advantageously with a conventional injection mixer which is placed upstream of the mixing apparatus according to the invention. This injection mixer may have a piston which reliably ensures mechanical forced cleaning. The mixing apparatus with rotatable hollow piston, located downstream of this injection mixer, ensures an even better degree of mixing, especially in the case of stringent standards and of critical products, for example filled polyurethanes.

Further advantages and details of the invention will emerge from the description of two embodiments given below in relation to the drawings, in which.

Figure 1:
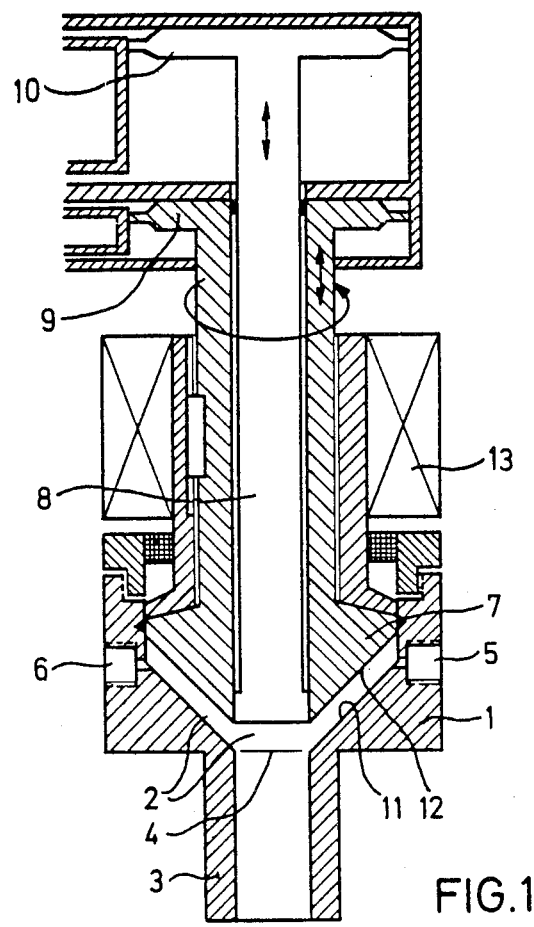
FIG. 1 is an elevational cross-section of an embodiment of the mixing apparatus according to the invention.

According to FIG. 1, the mixing apparatus consists of a housing 1 in which a mixing chamber 2 is formed. The mixing chamber merges into an outlet tube 3. The outlet orifice of the mixing chamber is marked 4. Feed lines lead into the mixing chamber via inlet orifices 5 and 6.

A hollow piston 7, containing an expulsion piston 8, is rotatably arranged in the mixing chamber 2. This expulsion piston has dimensions matching those of the outlet tube 3, and is flush with the latter. The hollow piston and the expulsion piston can be moved to and fro independently of one another by hydraulic pistons 9 and 10 respectively.

Figure 2:
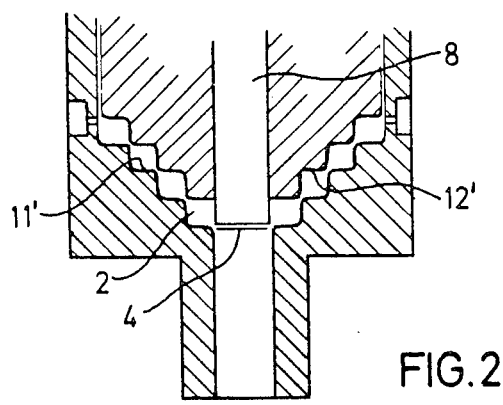
FIG. 2 is an elevational cross-section of a modification of a part of this embodiment, in which the surfaces of the shearing gap are profiled.

The mixing chamber wall 11 nearest the sprue corresponds roughly to the surface of a truncated cone, tapering uniformly towards the outlet orifice 4. The angle of inclination to the lengthwise axis of the hollow piston 7 is from 0° to 90°. The other mixing chamber wall is formed by the end face 12 of the hollow piston, which can be pushed into the mixing chamber 2 up to the outlet orifice of the latter, and forms a seal against the cylindrical surface of the mixing chamber. A shearing gap is thus created between the surfaces 11 and 12, and the liquid components are injected into this gap. To effect a change of direction, ie. to throttle the components or stream of mixture, the mutually fitting surfaces 11' and 12' which form the shearing gap can be profiled (FIG. 2).

In operation, mixing of the components injected under pressure through the orifices 5 and 6 occurs in the mixing chamber 2 for as long as the hollow piston 7 permits the components to enter. To throttle the flow of the component mixture towards the outlet orifice 4, the expulsion piston 8 can be moved towards the orifice 4, the axial distance between them being adjustable. When a mixing process is to be terminated, the rotating hollow piston, driven by the device 13, is moved downward so as to seal the inlet orifices 5 and 6 and at the same time to effect mechanical forced cleaning of the mixing chamber 2 by pushing out any residual mixture. Final cleaning is then effected by the expulsion piston 8 in the course of its movement through the outlet tube 3.

Figure 3:
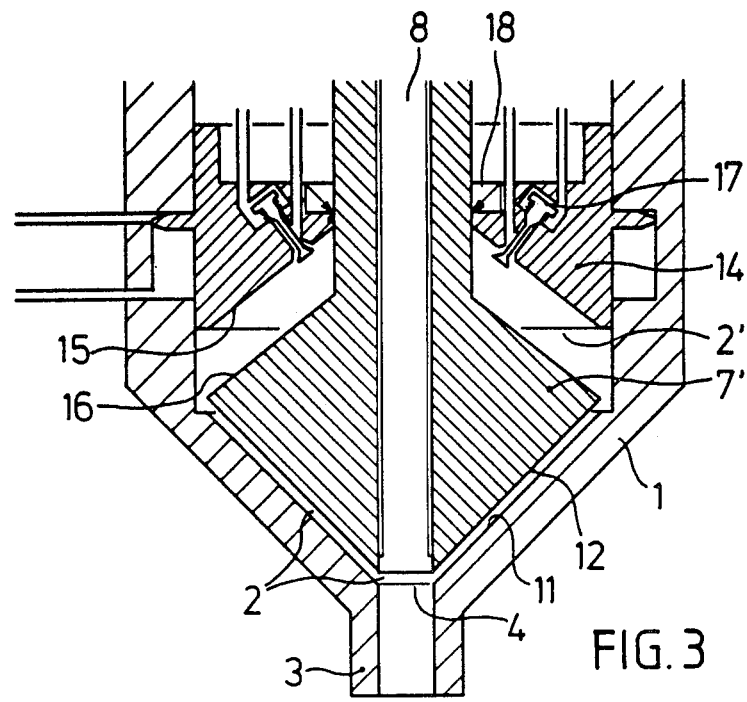
FIG. 3 is an elevational cross-section of the lower part of another embodiment in which the rotatable hollow piston has a double cone.

The embodiment shown in FIG. 3 is provided with a rotatable hollow piston 7 which has a double cone in the region of the mixing zone. The rear mixing chamber wall 15 is formed by a piston 14, which can be moved in the axial direction, and whose surface 15, facing the hollow piston, is approximately complementary to the rear surface 16 of the hollow piston. The piston 14 contains the feed lines and return lines for the individual components.

The construction of the hollow piston 7 and of the additional piston 14 in particular permit processing of filled components. For this purpose, the mixing chambers 2 and 2' which are bounded respectively by the surfaces 11 and 12 and the surfaces 15 and 16 can be varied in size, independently of one another, by setting appropriate gap widths, since the position of the hollow piston relative to the mixing chamber wall can be adjusted independently of its position relative to the position of the piston 14. We have found that mixing of the component takes place most advantageously if the two gap widths are not identical and instead the rear gap width of chamber 2' is made greater than the width of chamber 2. The mixing apparatus can then, if the components are introduced separately, be operated at substantially lower speeds of rotation and yet give the same degree of mixing.

This also effects the choice of the seal 18 which seals the shaft off from the components, since, due to the lower speeds of rotation of the smaller radius of the shaft, lower peripheral speeds result.

The mixing system is cleaned and closed by moving the piston 14 hydraulically up against the hollow piston 7', thereby forcing the mixture contained in the mixing chamber 2' into the mixing chamber 2. This cleaning process is assisted by the rotating movement of the hollow piston. Before the last stage of this sequence, the component valves 17 are closed, so that the back-pressure created on retracting the piston 14 does not allow reaction mixture to flow into the valves. The valves 17 preferably have a conical shape which assists automatic closing, the closing process being effected by changing the component pressure in the feed line.

The second stage of the closing process can then be effected without rotation of the hollow piston 7', since the mixture present in the mixing chamber 2 is already adequately homogenized so that when it is expelled into the outlet tube 3 as the result of what is now the joint movement of the pistons in the direction of the mixing chamber wall 11 nearest the sprue, no after-run occurs.

The cleaning of the outlet tube is effected by the stroke of the expulsion piston 8.

To effect the opening movement, the gap width of the mixing chamber 2 is first adjusted while the component valves are still closed. The component feed takes place, after the rotating movement of the hollow piston has started, during retraction of the piston 14. In this way uniform filling of the mixing chamber 2' is ensured, and the mixing-in of air and the formation of inadequately mixed forerun is prevented. The rotation of the hollow piston 7' produces uniform filling of the mixing chamber 2 and adequate homogenization of the components which enter.

Figure 4:
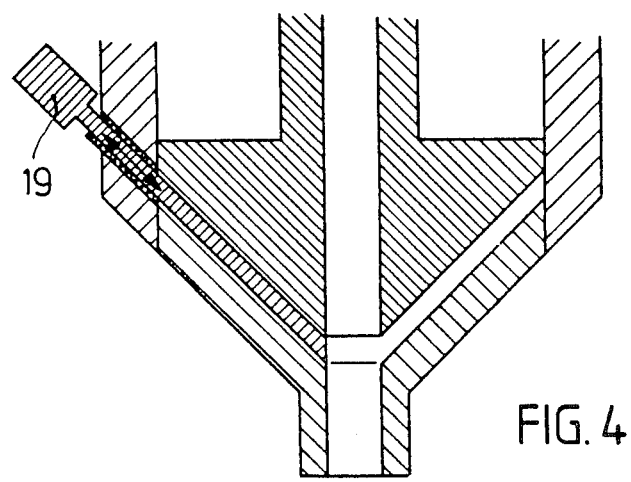
FIG. 4 is a schematic elevational cross-section of a part of an embodiment, which indicates how the gap surfaces can be freed from residual mixture with the aid of cutting tools.

When processing components which because of high adhesive forces cling particularly tenaciously to the metal surfaces forming the shearing gap, so that complete cleaning of these surfaces is no longer ensured, the surfaces can be freed from residual mixture with the aid of cutting tools 19 which can be caused to slide into the mixing chamber, such cleaning being effected, for example, at intervals of several cycles or before switching off the mixing apparatus (FIG. 4).

The mixing apparatuses according to the invention can be used advantageously for the production of filled plastics. The fillers can be introduced directly into the shearing gap. Premixing the solids with one of the plastics components is unnecessary. If they are of appropriately firm consistency, the solids trapped on bringing the pistons together assist the cleaning process by abrading residual mixture remaining from the preceding cycles.

We claim:

1. A mixing apparatus for multi-component plastics, especially polyurethane, comprising a mixing chamber, which possesses inlet orifices for the individual components and an outlet orifice for the component mixture, as well as a control member which can be moved to and fro between a position which leaves the inlet orifices open and a position which shuts off the inlet orifices to the mixing chamber, the control member being constructed as a hollow piston containing an independently controllable expulsion piston, the end face, facing the mixing chamber, of the hollow piston forming the mixing chamber wall opposite the outlet orifice and the outlet orifice being followed by an outlet tube of smaller cross-section than that of the mixing chamber, through which tube the expulsion piston, having the same cross-section as the outlet tube, can be passed, wherein the hollow piston is rotatable and its end face forms a variable shearing gap with the mixing chamber wall nearest the outlet orifice, the gap serving to mix the components.

2. A mixing apparatus as claimed in claim 1, wherein the surfaces which form the shearing gap are overall non-planar and are at least approximately complementary to one another.

3. A mixing apparatus as claimed in claim 1, wherein the hollow piston has a double cone.

4. A mixing apparatus as claimed in claim 1, wherein the rear mixing chamber wall is formed by an axially movable piston.

* * * * *